A. E. JENNINGS.
TIRE TREAD.
APPLICATION FILED DEC. 29, 1919.
1,395,576.
Patented Nov. 1, 1921.
2 SHEETS—SHEET 1.
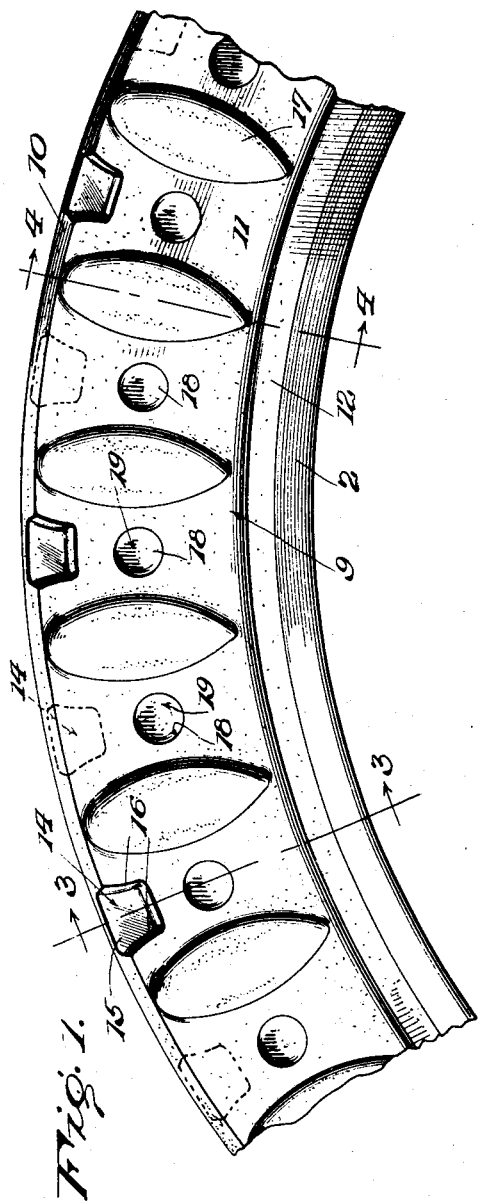
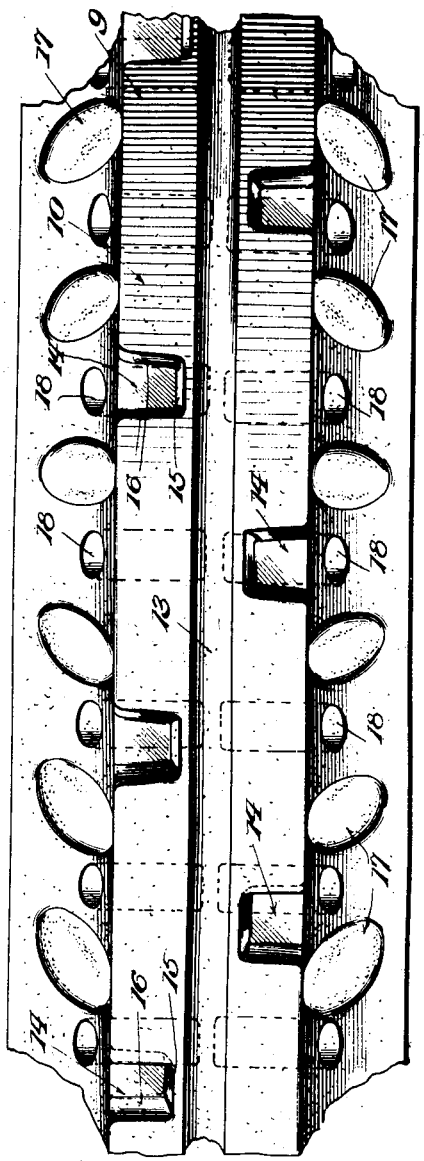
Inventor.
Aaron F. Jennings
by Lacy & Lacy,
his Atty's.

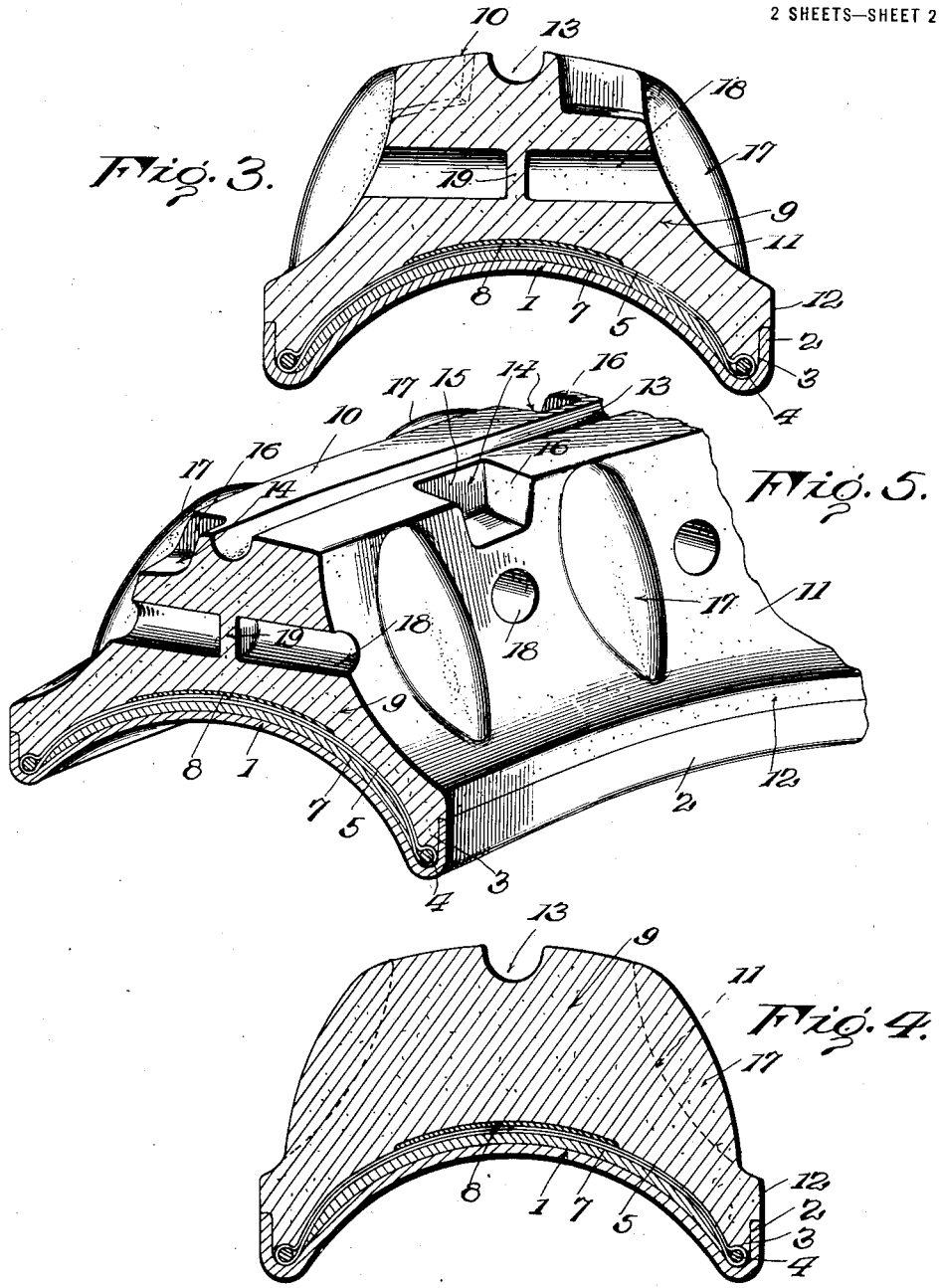

UNITED STATES PATENT OFFICE.

AARON E. JENNINGS, OF OWENSBORO, KENTUCKY, ASSIGNOR OF ONE-HALF TO S. J. GISH, OF CENTRAL CITY, KENTUCKY.

TIRE-TREAD.

1,395,576.   Specification of Letters Patent.   Patented Nov. 1, 1921.

Application filed December 29, 1919. Serial No. 347,931.

*To all whom it may concern:*

Be it known that I, AARON E. JENNINGS, citizen of the United States, residing at Owensboro, in the county of Daviess and State of Kentucky, have invented certain new and useful Improvements in Tire-Treads, of which the following is a specification.

This invention relates to improvements in tire treads and while the invention is designed more particularly for embodiment in a tire armor such as disclosed in my co-pending application filed December 5, 1919, Serial No. 342,685, the features of construction may equally as well find embodiment in solid tire construction or even in tire casing construction and, therefore, while there is disclosed herein a specific embodiment of the invention, it will be understood that this disclosure is illustrative merely and is not to be construed as imposing any restrictions on the uses to which the invention may be put.

The general object of the present invention is to provide a solid tire tread which will possess maximum durability accompanied by a desirable degree of yieldability and which will further possess features tending to prevent skidding and to increase the traction of the tire in service.

More specifically, one of the primary objects of the invention is to provide a tire tread of such construction that while the area of the tread surface which contacts the road at any one time is relatively small, a maximum traction force will be obtained under all road conditions, the tread embodying features of construction which adapt the tread to grip the road surface whether the said surface be smooth and dry or wet or muddy, and thus the tread possesses the advantage of enabling a vehicle the wheels of which are equipped therewith, to be driven over all kinds of roads and in all kinds of weather. In fact, the tread is so constructed that spinning of the wheels equipped therewith is prevented to such an extent as to insure against a vehicle being stalled in a mudhole or on a slippery or muddy hill or on a road covered with deep snow or sleet.

Another object of the invention is to so construct the tread, and particularly as concerns the traction features thereof, that none of the advantages flowing from the presence of these features will be lost or in any way impaired even after the tread has been greatly worn down in service so that, unlike ordinary tire treads possessing anti-skid features, the tread of the present invention will not become worn smooth even after a protracted period of use.

Another object of the invention is to so construct the tread that certain of the traction elements provided for preventing spinning of the wheels will constitute means for bracing and reinforcing the body of the tread so that the road surface engaging portion of the body may be made relatively narrow without, however, being undesirably weakened and, at the same time, the disposition and arrangement of the said elements is such that notwithstanding the narrowness of the tread surface, maximum traction force may be obtained.

The invention also has as one of its principal objects to so construct the tread that notwithstanding its solid nature it will possess a desirable degree of resiliency and yieldability and will thus not only exert a cushioning action in service but also will be prevented from becoming injured through impact with stones and other obstructions met with in its passage over the road surface. Thus, while in the illustrated embodiment of the invention the tread is employed in connection with a pneumatic tire, the tread will in itself possess a certain degree of resiliency and it will yield to a certain extent when coming in contact with stones or other objects so that there will be less likelihood of its being cut or bruised by reason of such contact.

Another important object of the invention is to so construct the tread as to prevent side skidding in service when traveling over wet, slippery or muddy roads.

In the accompanying drawings:

Figure 1 is a side elevation of a portion of the tread embodying the present invention.

Fig. 2 is a plan view of the structure shown in Fig. 1.

Fig. 3 is a vertical transverse sectional view on the line 3—3 of Fig. 1.

Fig. 4 is a similar view on the line 4—4 of Fig. 1.

Fig. 5 is a fragmentary sectional perspective view of the tread embodied as stated.

As before stated, while the tread of the present invention may be embodied in a solid tire or, in fact, in a tire casing, it is illustrated in the drawings as employed as an armor for pneumatic tires and inasmuch as the structure, aside from the tread *per se*, is fully disclosed in and forms the subject matter of my above identified copending application, a brief description of this portion of the structure will suffice. The numeral 1 indicates in general a metallic rim which is of annular form and transversely curved to fit about an ordinary pneumatic tire, this rim being provided at its opposite sides with outwardly projecting flanges 2 providing channels 3 in which are seated wires 4 which serve to anchor the sides of a fabric sheet or strip 5 which extends over a cushioning strip 7 interposed between said sheet 5 and the outer surface of the rim 1, a breaker strip 8 being disposed to extend about the outer side of the said sheet 5. The tread proper is indicated in general by the numeral 9 and the same will now be specifically described.

The tread 9 comprises a body of rubber or a composition of rubber and other materials and this body is of annular form and molded onto and surrounds the outer side of the rim 1, as clearly shown in Figs. 3, 4 and 5 of the drawings. The tread surface of the body is indicated by the numeral 10 and this surface is slightly transversely rounded as shown in Figs. 3 and 4, and may be formed relatively narrow, the side faces of the tread body being dished in as indicated by the numeral 11 and curved laterally and inwardly toward the axis of the said body from the opposite sides of the tread surface 10 to points adjacent the outer edges of the flanges 2, from which points the side faces are straight and flat as indicated by the numeral 12 and preferably flush with the outer faces of the respective flanges 2. Thus, the tread body has the greater portion of its side faces of concave form and the body is of greatly increased transverse thickness or breadth from its tread surface 10 to its surface which is united to the rim 1. Of course, the curvature of the side faces 11 may be more or less pronounced as desired or, in other words, may be very slight or, on the other hand, of a marked degree. At this point it will be evident by reference particularly to Fig. 3 of the drawings, that the width of the tread surface 10 will remain approximately the same as the tread becomes worn in service and, in fact, until it is worn down nearly to the rim 1, so that during the entire life of the tread none of the advantages accruing from the employment of a narrow tread surface will be lost.

In order to prevent skidding or lateral slipping of the tread in service, the tread body is preferably formed in its surface 10 with a circumferentially extending groove or channel 13 the walls of which will grip the road surface upon the occurrence of any tendency of the tread to skid or slip in the manner stated. In order to further provide against slipping or skidding of the tread in a lateral direction, and further to produce the desired traction and prevent spinning of the wheels upon slippery, muddy or snow covered surfaces, the tread body is formed at each side with a circumferential series of recesses or pockets 14 which open through the tread surface 10 and through the respective side faces 11 of the said body. These recesses or pockets 14 are located at opposite sides of the groove or channel 13 and preferably the pockets of the series at one side of the tread body alternate with the pockets at the opposite side, so as not to weaken to any extent the tread body. It will be evident that the inner walls 15 of the recesses or pockets 14 serve substantially the same purpose as the side walls of the groove or channel 13, that is to say, they will tend to prevent slipping or skidding of the tread. On the other hand, the remaining walls of each recess or pocket, indicated by the numeral 16, being presented in the direction of rotation of the tread in service, afford shoulders to provide the desired traction and to prevent spinning of the wheels under the conditions above recited.

While, as above stated, the walls 16 of the recesses or pockets 14 serve to grip the road surface to produce the desired traction under driving conditions, this function is chiefly performed by traction lugs which are indicated in the drawings by the numeral 17. These lugs 17 are formed integrally upon the faces 11 of the tread body and are of substantially semi-ellipsoidal form, the lugs being disposed with their major axes substantially radial to the axis of the tread as a whole. In other words, the traction lugs 17 extend transversely of the side faces 11 of the tread body and preferably the lugs are so positioned that each terminates at its upper end approximately flush with the tread surface 10 of the said body at the respective side of the body and at its lower end approximately at the outer edge of the portion 12 of the respective side face of the tread body. Due to the form given the lugs 17, their outer sides will be longitudinally curved substantially in opposition to the concave faces 11 of the tread body so that the lugs are of maximum thickness substantially midway between their ends and are tapered in the direction of their said ends. At this point it will be understood that in the use of the tread embodying the invention, the lugs 17 will continuously perform their traction function even though the tread becomes worn down to a considerable extent and, therefore, all advantages accruing from the use of these lugs are continuously present throughout the life of the tread as a whole and this is, of course, of great advantage as the tread will not become smooth and useless after being in service for a relatively long time. The general arrangement of the lugs 17 and recesses or pockets 14 is such that the pockets or recesses are located each between a pair of the lugs at the respective side of the tread and while in the illustrated embodiment of the invention one of the recesses or pockets is not provided between every two of the lugs 17, it will be evident that this might be the case if desired. In other words, the number of recesses or pockets in each series may be increased or decreased without departing from the spirit of the invention.

As previously pointed out, it is desirable that the tread be so constructed as to possess a desirable degree of resiliency and yieldability and in order that this may be accomplished, the tread body is formed at suitable intervals with transversely extending pockets 18, corresponding ones of which are preferably arranged opposite each other and separated at their inner ends by a web portion 19, the pockets being, in the present instance, substantially cylindrical and opening at their outer ends through the side faces 11 of the tread body and having their axes parallel to the axis of the tread as a whole. Also, in the illustrated embodiment of the invention, the pockets 18 of each series are so arranged that one of the pockets will be located between each two of the lugs 17 at the respective side of the tread body although, as in the instance of the recesses or pockets 14, the number of pockets 18 may be increased or decreased if found desirable, in which event they might be arranged otherwise than as illustrated in the drawings. It will further be observed, and particularly by reference to Figs. 3 and 5 of the drawings, that the pockets 18 are located inwardly of the recesses or pockets 14 with relation to the axis of the tread as a whole and, in fact, relatively close to the inner side of the tread body so that, as in the case of the other elements previously described, the advantages to be obtained through the provision of the pockets 18 will maintain substantially throughout the life of the tread. It will be evident that, due to the provision of the pockets 18, the tread may yield upon coming in contact with stones or other obstructions or inequalities in the road surface and thus there will be little likelihood of bruising or cutting of the tread surface 10. It will also be evident that any mud which might enter these pockets will be squeezed out under ordinary running conditions so that the pockets will be effective for the purpose stated even when the tread is passing over muddy road surfaces.

Having thus described the invention, what is claimed as new is:

1. A tire tread comprising a body having a circumferential tread surface and side faces sloping away from each other inwardly from the tread surface, the body being formed at intervals upon its said side faces with traction lugs and between the lugs with recesses extending transversely into the body.

2. A tire tread comprising a body having a circumferential tread surface and oppositely sloping side faces, the body being formed at intervals upon its said side faces with traction lugs and between the lugs with recesses extending transversely into the body, the said body being formed with other recesses oppositely located and opening through the said tread surface and through the side faces of the body.

3. A tire body having a circumferential tread surface and side faces, the said side faces being sloped laterally in opposite directions from the tread surface along inwardly curving lines whereby the said side faces are concave, and traction lugs formed at intervals within the concavities of the said faces, the said lugs being substantially of semi-ellipsoidal form and being positioned with their major axes substantially radial to the axis of the tread as a whole.

In testimony whereof I affix my signature.

AARON E. JENNINGS. [L. S.]